United States Patent [19]

Bender

[11] Patent Number: 5,556,454
[45] Date of Patent: Sep. 17, 1996

[54] MODIFIED NATURAL RESIN ESTERS, PROCESSES FOR THEIR PREPARATION AND THEIR USE AS BINDER RESINS IN PRINTING INKS

[75] Inventor: Albert Bender, Mainz, Germany

[73] Assignee: Hoechst Aktiengesellschaft, Germany

[21] Appl. No.: 381,771

[22] Filed: Feb. 1, 1995

[30] Foreign Application Priority Data

Feb. 4, 1994 [DE] Germany ............... 44 03 547.0

[51] Int. Cl.$^6$ ............... C09D 11/08; C09D 193/00
[52] U.S. Cl. ............... 106/218; 106/30 R; 106/500; 106/219; 106/241
[58] Field of Search ............... 106/218, 219, 106/241, 30 R, 500

[56] References Cited

U.S. PATENT DOCUMENTS 5,362,818  11/1994  Bender et al. .
5,376,719  12/1994  Bender .

FOREIGN PATENT DOCUMENTS 0041838  12/1981  European Pat. Off. .
0580954   2/1994  European Pat. Off. .
0619331  10/1994  European Pat. Off. .

*Primary Examiner*—David Brunsman
*Attorney, Agent, or Firm*—Bierman & Muserlian

[57] ABSTRACT

Toluene-soluble modified natural resin esters suitable as binder resins in ground pigments and printing inks for halftone gravure printing prepared by reacting at least one compound from each of the following substance groups A) to D)

A) natural resins and natural resin acids,
B) monocyclic and polycyclic phenols which are polyfunctional towards oxo compounds,
C) aldehydes and aldehyde acetals,
D) alcohols having at least two hydroxyl groups, and, optionally, further compounds selected from the following substance groups:
E) $\alpha,\beta$-ethylenically unsaturated carboxylic acids and their anhydrides,
F) fatty acids and fatty acid esters,
G) ethylenically unsaturated monomers,
H) ethylenically unsaturated hydrocarbon resins in the presence of
I) lithium compounds at a temperature of from 100° to 300° C. with elimination of water.

8 Claims, No Drawings

MODIFIED NATURAL RESIN ESTERS, PROCESSES FOR THEIR PREPARATION AND THEIR USE AS BINDER RESINS IN PRINTING INKS

STATE OF THE ART

Halftone gravure printing uses predominantly toluene-containing printing inks. It is known that such printing inks can be produced by pigmentation of a varnish which is obtained by dissolving suitable binder resins in toluene with addition of customary auxiliaries. The binder resin has the function of anchoring the pigment to the material being printed.

In general, toluene-containing printing inks are produced industrially by first synthesizing ground pigments or pigment concentrates which, after dilution with toluene or by making up with further binder systems, give the ready-to-use inks. In the production of these intermediates, it is particularly important to make sufficient resin for optimum wetting available to the pigment in the dispersion phase, without however reaching a viscosity which is too high. Exceeding the optimum viscosity can impair the desired flowability of the ground material or even lead to inhomogeneities. On the other hand, a lowering of the viscosity by excessive reduction of the concentration of the resin causes an unsatisfactory dispersing action. For economic reasons, it is therefore particularly important to produce printing inks such that at as low as possible a content of binder resins, they nevertheless still possess good printability and printing performance.

Binder resins used for printing inks are phenolic-resin-modified natural resin esters made from natural resins, $\alpha,\beta$-olefinically unsaturated compounds, phenols, aldehydes, esterifiers and modifiers. To prepare these phenolic-resin-modified natural esters, salts of divalent metals are usually required as catalyst. EP-A 0 548 506 describes the preparation of oil-soluble phenolic-resin-modified natural esters in the presence of magnesium compounds. Furthermore, in German Patent Application P 43 08 108.8, calcium or zinc compounds are proposed as catalysts for the modification of natural resins with phenols, aldehydes and polyols. However, in toluene, such systems have a relatively steep change in viscosity with concentration so that they are not suitable for use in ground pigments and pigment concentrates.

EP-A 0 477 449 discloses alkali metal compounds in connection with modified natural resins, but they are used exclusively in combination with zinc for the neutralization of natural resin acids to give resinates. It has also already been described that natural resins or their derivatives can be heated with aliphatic carboxylic acids or with acid-modified alkyd resins, phenols and formaldehyde in the presence of acid catalysts and the polycondensate formed is subsequently converted by means of metal oxides or hydroxides to the resinate (Derwent Abstract No. 87-358757/51 (JP-A 260810/87). However, it is known that the use of resinates as binder leads to relatively resin-rich inks.

In U.S. Pat. No. 5,376,719, alkali metal compounds are also proposed as catalyst for the reaction of cyclopentadiene compounds with natural resin acids, phenols and aldehydes. The unesterified phenolic-resin-modified cyclopentadiene resins obtained are well suited as binders for offset printing, but not for halftone gravure printing.

It is further known that natural resins can be reacted with phenol and formaldehyde and also glycerol in the presence of magnesium oxide and basic lithium compounds to obtain oil-soluble resins (Chemical Abstract No. 120:324917 and 120:299598 (CN-A 1 077 462 and CN-A 1 077 461)). Although these binder resins are suitable for dispersing pigments for offset inks, they are not suitable for dispersing pigments in halftone gravure inks (Comparative Example 2).

The development of particularly fast-running printing machines and the increasing trend to print not only coated papers but also uncoated papers having increased absorbtivity places particularly high demands on the quality of binder resins for halftone gravure printing. In particular, they have to give the ink film a good appearance on the material being printed. On no account should binder resins together with pigment diffuse into the interior, since this is associated with loss of gloss and reduced abrasion resistance. The increased demands cannot always be satisfactorily met using the known binder resins.

OBJECTS OF THE INVENTION

It is an object of the invention to provide new binder resins which in toluene have a relatively flat viscosity versus concentration curve and which make possible the production of low-solids printing inks suitable for halftone gravure printing with high gloss and with low strike-through of the ink during printing.

These and other objects and advantages of the invention will become obvious from the following detailed description.

THE INVENTION

The novel resin ester of the invention is a toluene-soluble modified natural resin ester prepared by reacting at least one compound from each of the following substance groups A) to D)
A) natural resins and natural resin acids,
B) monocyclic and polycyclic phenols which are polyfunctional towards oxo compounds,
C) aldehydes and aldehyde acetals,
D) alcohols having at least two hydroxyl groups, and, optionally, further compounds selected from the following substance groups:
E) $\alpha,\beta$-ethylenically unsaturated carboxylic acids and their anhydrides,
F) fatty acids and fatty acid esters,
G) ethylenically unsaturated monomers,
H) ethylenically unsaturated hydrocarbon resins in the presence of
I) lithium compounds
at a temperature of from 100° to 300° C. with elimination of water. The preferred reaction temperature is 130° to 280° C.

The use of lithium compounds as condensation catalysts in the preparation of printing ink resins for halftone gravure printing based on resins modified natural resin esters achieves the desired results.

The compounds preferably used as compounds of the groups A) to I) are as follows:
A) natural resins or natural resin acids, preferably rosin, pine oil, tall resin, or disproportionated or partially hydrogenated or dimerized natural resin of any origin,
B) monocyclic or polycyclic phenols which are polyfunctional towards oxo compounds, preferably phenol, ($C_1$–$C_{12}$)-alkyl-phenols, arylphenols or aralkylphenols, cresols, 1,3,5-xylenols, isopropylphenol, p-tert-butylphenol, amyl-phenol, octylphenol, nonylphenol, diphenylolpropane, phenylphenol and cumyl-phenol, or addition products of phenols and ethylenically unsaturated monomers, preferably α-methylstyrene, α-chlorostyrene, vinyl-toluene, pinene and cyclopentadiene,
c) aldehydes or aldehyde acetals, preferably aliphatic ($C_1$–$C_7$)-aldehydes, particularly formaldehyde in its various monomeric, oligomeric and polymeric forms, acetaldehyde, butyraldehyde, isobutyraldehyde, benzaldehyde, furfural and glyoxal,
D) esterifiers containing at least two hydroxyl groups, preferably polyfunctional alcohols, particularly bifunctional alcohols such as glycols, or trifunctional alcohols such as trimethylolethane, trimethylolpropane and glycerol, or tetrafunctional alcohols such as pentaerythritol or pentafunctional alcohols such as dimerized trimethylolpropane, or hexafunctional alcohols such as dimerized pentaerythritol,
E) α,β-ethylenically unsaturated carboxylic acids or their anhydrides, particularly fumaric acid, maleic acid, maleic anhydride, itaconic acid, cinnamic acid, acrylic acid and methacrylic acid,
F) fatty acids, preferably fatty acids of animal or vegetable origin or obtained by refining, also fatty acid esters such as fatty acid glycerides, particularly in the form of vegetable or animal oils such as tall oil, cotton seed oil, soy oil, linseed oil, tung oil, fish oil, coconut oil and hydrogenated coconut oil,
G) ethylenically unsaturated monomers, preferably styrene, α-methylstyrene, indene,
H) ethylenically unsaturated hydrocarbon resins, preferably polymers or oligomers of singly and/or multiply ethylenically unsaturated ($C_5$–$C_9$)-hydrocarbons, particularly those selected from the group consisting of isoprene, cyclopentadiene, indene, cumarone and styrene, or copolymers of ethylenically unsaturated hydrocarbon resins with natural resins or natural resin acids and
I) lithium compounds, preferably oxides, hydroxides, carbonates and acetates.

The invention also provides for the preparation of toluene-soluble phenolic-resin-modified natural resin esters by reacting the components A) to I). The proportion of the individual components, based on the total amount of the components used, is from 30 to 95% by weight, preferably from 40 to 90% by weight, more preferably from 50 to 80% by weight, of natural resins or natural resin acids selected from group A); from 1 to 45% by weight, preferably from 5 to 40% by weight, more preferably from 10 to 35% by weight, of phenolic components selected from group B); from 1 to 20% by weight, preferably from 3 to 10% by weight, more preferably from 5 to 8% by weight, of aldehydes or aldehyde acetals selected from group C), in a molar ratio of the phenol component B) to the aldehyde component C) which is preferably in the range from 1:0.9 to 1:4.5, more preferably from 1:1 to 1:2.5, or, in lieu of the components selected from groups B) and C) or as a proportion of these, preferably up to 65% by weight of condensation products separately prepared from compounds of groups B) and C), preferably phenol resols, from 1 to 20% by weight, preferably from 3 to 15% by weight, more preferably from 4 to 10% by weight, of polyol components selected from group D), from 0 to 20% by weight, preferably from 2 to 10% by weight, of α,β-ethylenically unsaturated carboxylic acids or their anhydrides selected from group E), from 0 to 40% by weight, preferably from 1 to 10% by weight, of α,β-unsaturated fatty acids or fatty acid esters selected from group F), from 0 to 30% by weight, preferably from 1 to 25% by weight, more preferably from 2 to 10% by weight, of ethylenically unsaturated monomers selected from group G), from 0 to 30% by weight, preferably from 1 to 25% by weight, more preferably from 2 to 10% by weight, of ethylenically unsaturated hydrocarbon resins selected from group H), from 0.01 to 5% by weight, preferably from 0.1 to 2% by weight, more preferably from 0.3 to 1.5% by weight, of lithium compounds, calculated as LiOH, selected from group I).

The natural resin esters modified by the invention are preferably prepared by initially charging molten natural resin to which can be added, for the purposes of resin modification, α,β-olefinically unsaturated carboxylic acids, fatty acids, ethylenically unsaturated monomers or ethylenically unsaturated hydrocarbon resins. Preferably, the reaction mixture comprising these components, which is initially charged prior to the addition of the lithium compound, has an acid number above 80 mg of KOH/g, preferably above 100 mg of KOH/g. Lithium compound, polyol, phenol and aldehyde are then introduced into the initially charged reaction mixture. It is also possible to use, in place of phenol and aldehyde or else as a proportion of these, a condensation product separately prepared by known methods from phenols and aldehydes in the presence of basic catalysts at a temperature of from 50° to 160° C., preferably from 60° to 100° C., at atmospheric pressure or superatmospheric pressure, preferably phenol resol.

The condensation is then commenced in the temperature range from about 130° to 160° C. If the resol is only prepared in situ in the melt from the components phenol and aldehyde, the reaction is usually carried out at a pressure of up to 10 bar. If a preprepared resol is used exclusively, the reaction is preferably carried out at atmospheric pressure. The mixture is subsequently heated to temperatures of from 200° to 280° C., with distillation of the water of reaction.

The water formed in the condensation reaction and the esterification of natural resin acids can be distilled at atmospheric pressure. However, it is preferably removed continuously in the temperature range from 200° to 280° C., preferably from 220° to 270° C., by azeotropic distillation using an inert organic solvent capable of azeotrope formation with water or by vacuum distillation at a pressure of from 0.1 to 1000 mbar, preferably from 100 to 900 mbar. The latter measures lead to a reduction in the reaction time.

Suitable inert entrainers which can be added in the preparation of resins of the invention are preferably saturated aliphatic or aromatic hydrocarbons whose boiling points at atmospheric pressure are preferably above 100° C., for example alkanes, in particular hexane, decane, mixtures of aliphatic hydrocarbons such as are present, for example, in gasoline or in corresponding petroleum fractions, also preferably toluene or xylene. The entrainers are used in amounts of preferably from 0.01 to 20% by weight, based on the total weight of material used.

In the synthesis process of the invention, the progress of the condensation reaction is monitored by means of the acid number of the reaction mixture. Thus, the acid number of the resin mixture at the beginning can be preferably up to 200mg of KOH/g of resin, determined by the customary methods. It falls continually as the reaction progresses with elimination of water. The esterification reaction is continued until the reaction of the invention has reached the desired end state and the acid number has dropped to values of <50, preferably <40, mg of KOH/g of resin. If the reaction is carried out at atmospheric pressure or by means of azeotropic distillation, volatile constituents, which may include the entrainer, are removed from the reaction product by distillation, finally under reduced pressure.

Since natural resins of different origin can be different in respect of their composition, for example can contain different amounts of terpenes without a carboxyl group or have a different isomer distribution of the resin acids, the same formulation can also result in different product properties, for example with regard to the viscosity. However, the formulation can then be matched to the respective natural resin by small changes in the component concentrations.

The molecular weight of the resins of the invention can be determined by gel permeation chromatography of the resin solutions in tetrahydrofuran (THF) on polystyrene foam in a permeation instrument by known methods. The average molecular weight (weight average $M_W$) of the resins of the invention by the measurement results obtained preferably has values of $M_W>5000$ and has no critical upper limit. However, the average molecular weight $M_W$ is particularly preferably within a range from 20,000 to 150,000, more preferably from 50,000 to 120,000.

The viscosities are determined, for example, by measuring the 25% strength by weight toluene solutions with a conventional rotation viscometer at 23° C. The viscosities are preferably within a range from 3 to 100 mPa.s, preferably from 4 to 50 mPa.s.

As is generally customary in the preparation of phenolic-resin-modified natural resin esters, the required solution viscosities can be optimized by addition to the resin melts of further compounds such as rosin, rosin esters, resinates, further phenolic-resin-modified rosins or high-boiling mineral oils in subordinate amounts.

Natural resin esters modified by the invention and having a significantly higher molecular weight are obtained, particularly when the water of reaction is removed by azeotropic or vacuum distillation. Raising the molecular weight is particularly desired when binder resins which achieve high viscosities in toluene are to be prepared. Inks formulated with such binders can be made low in solids.

Since use of other monovalent cations such as sodium or potassium is not able to achieve an increase in the molecular weight, even with removal of the water of reaction by azeotropic or vacuum distillation (Comparative Example 1), this advantageous behavior in the catalysis by lithium compounds is to be judged as extra-ordinarily surprising.

Also surprising is the fact that the viscosity of the resulting resins can be controlled by variation of the concentration of the lithium compounds in the polycondensation. Here, the viscosity usually rises with increasing concentration of the lithium compounds (Examples 9 and 10).

In addition, the binder resins of the invention have the advantageous property of a relatively flat viscosity curve on dilution in toluene, i.e. their viscosity increases only slightly with increasing resin content. This also makes them superior, particularly to binder resins which contain divalent metal cations such as calcium or zinc, as are described, for example, in the German Patent Application P 43 08 108.8. This different behavior of resins which contain lithium ions compared with those containing calcium ions can be said to be extraordinarily surprising.

The invention further provides for the use of the resins of the invention as binder resins in ground pigments and pigment concentrates and also in printing inks containing toluene, preferably for halftone gravure printing. The resins of the invention have excellent compatability with other binders, for example with natural resin esters of the prior art, resinates or hydrocarbon resins. Furthermore, they have an excellent wetting behavior for the pigments used in halftone gravure printing.

The toluene-containing gravure printing inks are formulated by the customary methods. For this purpose, the suitable binder resin is dissolved in toluene and this varnish is pigmented or a previously prepared ground pigment is diluted with toluene. Additives which can be used in addition are those which are otherwise customary, for example fillers such as calcium carbonate, or surface active agents for improving the pigment dispersion such as lecithin or waxes for improving the abrasion resistance.

The invention is illustrated by the following examples. The parts and percentages specified in the examples are by weight, unless otherwise indicated. However, it should be understood that the invention is not intended to be limited to the specific embodiments.

EXAMPLE 1

Preparation of a phenolic-resin-modified natural resin ester modified with maleic anhydride under continuous distillation of the water of reaction at atmospheric pressure In a heatable 2l multi-neck flask fitted with stirrer, thermometer, dropping funnel, descending condenser and filling tube, 967 g of commercial rosin, which was also referred to as natural resin or natural resin acid, and 48 g of maleic anhydride were heated under a nitrogen atmosphere for one hour at 160° C. 5 g of lithium hydroxide, 133 g of pentaerythritol and 16 g of glycerol were added at this temperature. Subsequently, 121 g of an aqueous phenol-formaldehyde condensation product (70% strength in water, viscosity 350 mPa.s) were added dropwise over a period of one hour. Water began to distill off during this procedure. The mixture was then heated to 255° C. with continual distillation of water. As soon as the acid number had dropped below 35 mg of KOH/g of resin, a vacuum of 100 mbar was applied to the mixture for 30 minutes. After releasing the vacuum with nitrogen, 1,156 g of a brittle, pulverizable resin having a softening point of 14.6° C. were obtained. A 25% strength solution in toluene had a viscosity of 5 mPa.s at 23° C. An average molecular weight of 22,500 was determined by means of gel permeation chromatography. The reaction time for the preparation was 14 hours.

EXAMPLE 2

Preparation of a phenolic-resin-modified natural resin ester under continuous distillation of the water of reaction at atmospheric pressure In a heatable 2l multi-neck flask fitted with stirrer, thermometer, dropping funnel, reflux condenser and filling tube, 900 g of commercial rosin, 63 g of nonylphenol, 116 g of diphenylolpropane and 83 g of glycerol were melted under a nitrogen atmosphere. 6.5 g of lithium hydroxide and then 78 g of paraform-aldehyde were then introduced into the melt at a temperature of 100° C. The mixture was homogenized for 30 minutes by stirring. Subsequently, the heating was adjusted to a temperature of 130° C., so that water began to condense in the reflux condenser. After 2 hours, the condenser was combined with a distillation apparatus and water was distilled off. During this procedure, the temperature was increased continuously up to 250° C. with continual distilling off of water. The progress of the reaction was determined by means of the acid number of the product. As soon as this has dropped to 25 mg of KOH/g of resin, the elimination of water was largely complete. Volatile components were distilled off over a period of 10 minutes under a vacuum of 100 mbar. After pressure equilibration with nitrogen, the melt was discharged and after cooling, yielded 1,055 g of a brittle, pulverizable resin having a softening point of 135° C. A 25% strength solution in toluene had a viscosity of 4 mPa.s at 23° C. An average molecular weight of 21,500 was determined by gel permeation chromatography. The reaction time for the preparation was 8 hours.

EXAMPLE 3

Preparation of a phenolic-resin-modified natural resin ester under continuous azeotropic distillation of the water of reaction, using the formulation of Example 2

In a heatable 21 multi-neck flask fitted with stirrer, thermometer, dropping funnel, reflux condenser and filling tube, 900 g of commercial rosin, 63 g of nonylphenol, 116 g of diphenylolpropane and 83 g of glycerol were melted under a nitrogen atmosphere. 6.5 g of lithium hydroxide and then 78 g of paraform-aldehyde were introduced into the melt at a temperature of 100° C. The mixture was homogenized for 30 minutes by stirring. Subsequently, the heating was adjusted to a temperature of 130° C., so that water began to condense in the reflux condenser. After 2 hours, the condenser was combined with an azeotropic water separator and water was distilled off with circulating xylene. During this procedure, the temperature was increased continuously up to 250° C. and when 200° C. was reached, a further 50 g of xylene were added with continual distilling off of water as an azeotrope with xylene. The progress of the reaction was determined by means of the acid number of the product. As soon as this has dropped to 25 mg of KOH/g of resin, the elimination of water was largely complete. The solvent present in the melt was distilled off under atmospheric pressure for 30 minutes. Volatile components were distilled off over a period of 10 minutes under a vacuum of 100 mbar. After pressure equilibration with nitrogen, the melt was discharged and after cooling, yielded 1,058 g of a brittle, pulverizable resin having a softening point of 145° C. A 25% strength solution in toluene had a viscosity of 17 mPa.s at 23° C. An average molecular weight of 96,500 was determined by gel permeation chromatography. The reaction time for the preparation was 8 hours.

COMPARATIVE EXAMPLE 1

This was carried out as described in Example 3, except that the lithium hydroxide was replaced by an equivalent amount (11.3 g) of sodium hydroxide. The product obtained had a comparatively low viscosity and a 25% strength solution in toluene had a viscosity of only 3.5 mPa.s at 23° C.

EXAMPLE 4

Preparation of a phenolic-resin-modified natural resin ester under continuous vacuum distillation of the water of reaction The procedure was as described in Example 3, except that above a reaction temperature of 200° C., the water of reaction was distilled off at a pressure of 700 mbar. The product obtained after a reaction time of 8 hours had, as a 25% strength solution in toluene, a viscosity of 13 mPa.s at 23° C.

EXAMPLE 5

Preparation of a phenolic-resin-modified natural resin ester using in-situ resol formation in the melt under pressure In a heatable 21 multi-neck flask fitted with stirrer, thermometer, dropping funnel, reflux condenser and filling tube, 900 g of commercial rosin, 63 g of nonylphenol, 116 g of diphenylolpropane and 83 g of glycerol were melted under a nitrogen atmosphere. 6.5 g of lithium hydroxide and then 78 g of paraform-aldehyde were introduced into the melt at a temperature of 100° C. The mixture was homogenized for 30 minutes by stirring. Subsequently, the vessel was closed so as to be pressure-tight and the heating was adjusted to a temperature of 150° C., so that a pressure of 2 bar built up. After 2 hours, the vessel was ventilated with nitrogen and water was distilled off at this stage via a superposed condenser. The condenser was then combined with an azeotropic water separator and water was distilled off with circulating xylene. During this procedure, the temperature was increased continuously up to 250° C., so that water continually distilled off as an azeotrope with xylene. The progress of the reaction was determined by the acid number of the product. As soon as this had dropped to 25 mg of KOH/g of resin, the elimination of water was largely complete. The solvent present in the melt was first distilled off under atmospheric pressure over a period of 30 minutes. Volatile components were distilled off over a period of 10 minutes under a vacuum of 100 mbar. After pressure equilibration with nitrogen, the melt was discharged and after cooling, yielded 1,060 g of a brittle, pulverizable resin having a softening point of 145° C. A 25% strength solution in toluene had a viscosity of 21 mPa.s at 23° C. An average molecular weight of 105,000 was determined by gel permeation chromatography. The reaction time for the preparation was 9 hours.

EXAMPLE 6

Preparation of a phenolic-resin-modified natural resin ester modified with styrene The procedure was as described in Example 1, except that 10 g of styrene were added in addition to the maleic anhydride. The resin obtained had a softening point of 143° C. and the 25% strength solution in toluene had a viscosity of 5 mPa.s at 23° C.

EXAMPLE 7

Preparation of a phenolic-resin-modified natural resin ester modified with a hydrocarbon resin under azeotropic distillation of the water of reaction The procedure was as described in Example 3, except that a further 25 g of a commercial hydrocarbon resin (iodine number 121 g of iodine/100 g of resin) were added to the rosin. The yield was 1,083 g and the resin obtained had a softening point of 148° C. and an average molecular weight of 110,000. A 25% strength solution of the resin in toluene had a viscosity of 25 mPa.s at 23° C.

EXAMPLE 8

Preparation of a phenolic-resin-modified natural resin ester modified with maleic anhydride, a hydrocarbon resin and a vegetable oil under continuous azeotropic distillation of the water of reaction In a heatable 21 multi-neck flask fitted with stirrer, thermometer, dropping funnel, distillation apparatus and filling tube, 967 g of commercial rosin, 48 g of maleic anhydride, 30 g of a commercial hydrocarbon resin (iodine number 121 g of iodine/100 g of resin) and 20 g of hydrogenated coconut oil were heated under a nitrogen atmosphere for one hour at 160° C. 5 g of lithim hydroxide, 133 g of pentaerythritol and 16 g of glycerol were added at this temperature. Subsequently, 121 g of an aqueous phenol-formaldehyde condensation product (70% strength in water, viscosity 350 mPa.s) were added dropwise over a period of one hour with water being distilled off. The mixture was then heated to 255° C. with continual distilling off of water. As soon as the acid number had dropped below 35 mg of KOH/g of resin, a vacuum of 100 mbar was applied to the mixture for 30 minutes. After releasing the vacuum with nitrogen, 1,156 g of a brittle, pulverizable resin having a softening point of 146° C. were obtained. A 25% strength solution in toluene had a viscosity of 5 mPa.s at 23° C. An average molecular weight of 5,500 was determined by gel permeation chromatography. The reaction time for the preparation was 14 hours.

EXAMPLE 9

Influence of the lithium hydroxide concentration

In a heatable 2l multi-neck flask fitted with stirrer, thermometer, dropping funnel, reflux condenser and filling tube, 967 g of commercial rosin and 63 g of maleic anhydride were heated under a nitrogen atmosphere for one hour at 160° C. 2.5 g of lithium hydroxide, 133 g of pentaerthritol and 16 g of glycerol were then added at this temperature. Subsequently, 80 g of an aqueous phenol-formaldehyde condensation product (70% strength in water, viscosity 350 mPa.s) and 77 g of an aqueous p-t-butylphenol-formaldehyde condensation product (65% strength in water, viscosity 250 mPa.s) were added dropwise over a period of one hour. During this procedure, the reflux condenser was replaced by a descending condenser and water was distilled off. The mixture was heated to 225° C. with continual distilling off of water. As soon as the acid number has dropped below 35 mg of KOH/g of resin, a vacuum of 100 mbar was applied to the mixture for 30 minutes. After releasing the vacuum with nitrogen, 1,126 g of a brittle, pulverizable resin having a softening point of 146° C. were obtained. A 25% strength solution in toluene had a viscosity of 20 mPa.s at 23° C. and a 50% strength solution in toluene had a viscosity of 4,800 mPa.s at 23° C.

EXAMPLE 10

Influence of the lithium hydroxide concentration

The procedure was as described in Example 9, except that 5 g of lithium hydroxide were used. A 25% strength solution of the resulting resin had a viscosity of 45 mPa.s at 23° C. and a 50% strength solution in toluene had a viscosity of 9,300 mPa.s at 23° C.

COMPARATIVE EXAMPLE 2

Preparation of a resin modified with magnesium oxide and lithium carbonate, in accordance with CN-A 1 077 461

600 g of commercial rosin, 85 g of phenol, 95 g of formalde-hyde, 1 g of lithium carbonate and 2 g of magnesium oxide were heated for 3 hours at reflux. The reflux condenser was then replaced by a descending condenser and the mixture was heated to 220° C. with distillation of water. 58 g of glycerol were added, the temperature was maintained at 270° C. for 4 hours and finally a vacuum of 100 mbar was applied for a further 1 hour to remove volatile components. Cooling yielded a resin which, as a 25% strength solution in toluene, had a viscosity of 3 mPa.s.

Preparation of pigment concentrates

Using conventional methods, pigment concentrates for halftone gravure printing using toluene were prepared from each of the binder resin of Example 5 (viscosity at 25% strength in toluene: 21 mPa.s/23° C., viscosity at 50% strength in toluene: 6,400 mPa.s/23° C.) and the resin described in Example 1 of the German Patent Application P 43 08 108.8 (viscosity at 25% strength in toluene: 30 mPa.s at 23° C., viscosity at 50% strength in toluene: 182,000 mPa.s at 23° C.) and the binder resin of Comparative Example 2 (viscosity at 25% strength in toluene: 3 mPa.s at 23° C.) by dispersion of a mixture of 34% by weight of binder resin, 13% by weight of ®Litholrubin (red pigment, manufactured by BASF AG) and 53% by weight of toluene in a ball mill for half an hour. While the ground pigment formulated using the binder resin of the invention was homogeneous and could be poured from the ball mill without problems, the ground pigment formulated with the comparison resin from P 43 08 108.8 was no longer fluid and, in addition, was inhomogeneous. The ink formulated with the binder resin of Comparative Example 2 was unstable, so that pigment and binder separated.

Application comparison

Using conventional methods, inks for halftone gravure printing were prepared from each of the binder resin of Example 1 (ink A) and[ two commercial phenolic-resin-modified natural resin esters.

comparison resin 1: zinc content, determined as ZnO, 4.5% by weight; viscosity (25% strength in toluene) at 23° C. 4.5 mPa.s (ink B), comparison resin 2: zinc content, determined as ZnO, 2.5% by weight; calcium content, determined as CaO, 1.3% by weight; viscosity (25% strength in toluene) at 23° C. 4 mPa.s (ink C)

by dispersion of a mixture of 24 g of binder resin, 9 g of Litholrubin pigment and 67 g of toluene, and these inks were printed onto paper using the gravure printing process.

The gloss of the printing, which should be as high as possible for a good printing result, was measured at an angle of incidence of 60° using a Lange laboratory reflectometer.

The strike-through of the inks to the reverse side of the material being printed, which should be as weak as possible for good printing behavior, was assessed visually, by measurement of the relative color density on the reverse side of the printed material, compared with the front side of the material. The ink formulated using the resin of the invention gave significantly glossier printing than the inks formulated using the resins of the prior art.

| Ink | A | B | C |
| --- | --- | --- | --- |
| Gloss [%] | 57 | 46 | 42 |
| Strike-through | weak | intermediate | weak |
| *Color density | (1) | (3) | (1) |

*0 = no color density on the reverse side;
6 = maximum color density on the reverse side ( = identical to color density on front side)

A dispersion of 18 g of binder resin of Example 3, 9 g of Litholrubin pigment and 73 g of toluene was used to prepare a low-resin ink D which was compared with the resin-rich ink B. Despite the resin content being reduced by 25% by weight, a similarly good printing result was obtained.

| Ink | D | B |
| --- | --- | --- |
| Gloss [%] | 47 | 46 |
| Strike-through | intermediate | intermediate |
| Color density | (3) | (1) |

Using conventional methods, yellow inks for halftone gravure printing using toluene were prepared from each of the binder resin of Example 1 (ink E) and a commercial resinate.

comparison resin 3: calcium content, determined as CaO, 4.5% by weight; viscosity (25% strength in toluene) at 23° C. 2.5 mPa.s (ink F)

by dispersion of a mixture of 24 g of binder resin, 9 g of ®Permanentgelb DHG N 22 (yellow pigment, manufactured by Hoechst AG) and 67 g of toluene, and these inks were printed onto paper using the gravure printing process.

The ink formulated using the resin of the invention gave significantly glossier printing than the ink formulated using the resinate.

| Ink            | E    | F            |
|----------------|------|--------------|
| Gloss [%]      | 54   | 46           |
| Strike-through | weak | intermediate |
| Color density  | (1)  | (3)          |

Various modifications of the natural resin esters and the inks of the invention may be made without departing from the spirit or scope thereof and it is to be understood that the invention is intended to be limited only as defined in the appended claims.

What is claimed is:

1. A toluene-soluble modified natural resin ester prepared by reacting at least one compound from each of the following substance groups A) to D)

A) natural resins and natural resin acids,
   B) monocyclic and polycyclic phenols which are polyfunctional towards oxo compounds,
   C) aldehydes and aldehyde acetals,
   D) alcohols having at least two hydroxyl groups, and, optionally, further compounds selected from the substance groups:
   E) $\alpha,\beta$-ethylenically unsaturated carboxylic acids and their anhydrides,
   F) fatty acids and fatty acid esters,
   G) ethylenically unsaturated monomers,
   H) ethylenically unsaturated hydrocarbon resins in the presence of
   I) lithium compounds at a temperature of from 100° to 300° C. with elimination of water.

2. A modified natural resin ester of claim 1, having a weight average molecular weight $M_w$ between 5,000 and 150,000.

3. A modified natural resin ester of claim 1, wherein a 25% strength by weight solution of the modified natural resin ester in toluene has a viscosity between 3 and 100 mPa.s at 23° C.

4. A process for preparing a modified natural resin ester of claim 1 comprising reacting 30 to 95% by weight of natural resins or natural resin acids from substance group A), 1 to 45% by weight of phenolic components selected from group B), 1 to 20% by weight of aldehydes or aldehyde acetals selected from group C), or, in place of the components selected from groups B) and C) or as a proportion of these, condensation products separately prepared from compounds of groups B) and C), 1 to 20% by weight of polyol components selected from group D), 0 to 20% by weight of $\alpha,\beta$-ethylenically unsaturated carboxylic acids or their anhydrides selected from group E), 0 to 40% by weight of fatty acids or fatty acid esters selected from group F), 0 to 30% by weight of ethylenically unsaturated monomers selected from group G), 0 to 30% by weight of ethylenically unsaturated hydrocarbon resins, selected from group H), and 0.01 to 5% by weight of lithium compounds, calculated as LiOH selected from the substance group I), in each case based on the total amount of the components used.

5. The process of claim 4 wherein the water of reaction is distilled off in the temperature range of 220° to 270° C. under a reduced pressure of 0.1 to 1,000 mbar or using an entrainer capable of azeotropic distillation with water.

6. A ground pigment or pigment concentrate containing a modified natural resin ester of claim 1 as a binder.

7. A printing ink containing a modified natural resin ester of claim 1 as a binder.

8. A halftone gravure printing ink containing a modified natural resin ester of claim 1 as a binder.

* * * * *